United States Patent [19]
Flick et al.

[11] 4,256,275
[45] Mar. 17, 1981

[54] HOMING SYSTEM AND TECHNIQUE FOR GUIDING A MISSILE TOWARDS A METAL TARGET

[75] Inventors: Edward A. Flick, Seminole; Timothy R. Holmes, St. Petersburg; Myles A. Larson, South Pasadena, all of Fla.

[73] Assignee: E-Systems, Inc., Dallas, Tex.

[21] Appl. No.: 956,727

[22] Filed: Nov. 1, 1978

[51] Int. Cl.³ .................... F41G 7/00; F42B 15/02; G06F 15/50
[52] U.S. Cl. .................... 244/3.19; 343/5 HM
[58] Field of Search .................... 244/3.14, 3.19; 343/5 HM, 7 ED

[56] References Cited
U.S. PATENT DOCUMENTS

| 3,631,485 | 12/1971 | Beazell, Jr. | 244/3.14 |
|---|---|---|---|
| 3,729,150 | 4/1973 | Conger | 244/3.14 |
| 3,972,042 | 7/1976 | Johnson | 343/5 HM |
| 4,142,695 | 3/1979 | Remmell et al. | 244/3.14 |

Primary Examiner—Theodore M. Blum
Attorney, Agent, or Firm—Robert V. Wilder; Albert M. Crowder, Jr.

[57] ABSTRACT

A homing system is provided for guiding a missile (10) towards a metal target. The metal target is illuminated by a radar unit (12) with a transmitted RADAR signal of predetermined frequency. The target reflects the RADAR signal and produces HARMONIC signals having frequencies that are harmonic with the predetermined frequency. An antenna (14) is mounted in the missile for receiving signals, including the HARMONIC signals produced by the target. A wave guide bandpass filter (18) receives signals from the antenna and passes selected HARMONIC signals to a filter output. A detector (34) is responsive to selected HARMONIC signals passed by the filter (18) to produce STRENGTH signals proportional to the signal strength of the selected HARMONIC signals. The STRENGTH signals are received by an error circuit (48) that produces ERROR signals indicating the direction of the target relative to the missile (10).

9 Claims, 2 Drawing Figures

HOMING SYSTEM AND TECHNIQUE FOR GUIDING A MISSILE TOWARDS A METAL TARGET

TECHNICAL FIELD

The present invention relates to missile guidance systems, and particularly relates to a homing system for guiding a missile during a terminal encounter with a metal target using harmonic signals produced by the metal target when illuminated by a transmitted radar signal.

BACKGROUND OF THE INVENTION

Missile guidance systems using radar to track a metal target and to guide the missile towards the metal target are well known. In a typical guidance system, the target is illuminated with radar signals (electromagnetic radiation at a radio frequency). Reflected signals from the target are detected by the guidance system and used to determine the direction of the target, the distance to the target and/or the movement of the target. Although such conventional systems have performed adequately, they are subject to interference from radar signals reflected from objects other than the target. Natural background backscatter or surface clutter results from radar signals being reflected from objects such as foilage, earth, sea waves or other objects capable of reflecting radar signals. In order to achieve desired performance characteristics, a guidance system for a missile should be able to detect and track a target even in the presence of surface clutter or background backscatter. The ability of a missile guidance system to distinguish the target from background backscatter is particularly important during a terminal encounter when the missile is in close proximity to the target.

Thus, a need has arisen for a missile guidance system capable of tracking a metal target when illuminated by radar signals when the target is obscured by background backscatter. In particular, a need has arisen for a guidance system capable of guiding a missile during a terminal encounter with a target which is illuminated with radar signals and is obscured by the presence of natural background backscatter.

DISCLOSURE OF INVENTION

The present invention fulfills the aforementioned needs by utilizing harmonic signals produced by a metal target when illuminated by radar to guide a missile towards the target.

In accordance with the present invention, a missile homing system guides a missile towards a metal target that is illuminated with a transmitted radar signal of a predetermined frequency. The metal target reflects the radar signal and produces HARMONIC signals having frequencies harmonic with the predetermined frequency. A system is provided in the missile for detecting the HARMONIC signals produced by the target and for producing ERROR signals in response thereto, indicating the direction to the metal target relative to the missile. The ERROR signals are applied to a missile guidance system which is responsive thereto for correcting the flight path of the missile to guide the missile towards the target.

The homing system of the present invention utilizes harmonic reradiation occurring due to the illumination of the metal plates of the target by electromagnetic waves. This harmonic reradiation is characteristic of metal objects and automatically discriminates against natural background backscatter that may be produced by foilage, earth and sea waves that are also illuminated by the transmitted radar signal.

A metal target typically includes plates that are bolted or riveted together which form microwave diodes in the vicinity of the point of contact between the metal plates. This diode structure acts as a harmonic generator and produces a harmonic rich backscatter, the predominant harmonic being the third. Thus, a metal target when illuminated by radar signals will produce HARMONIC signals that may be used to track the target.

In accordance with an embodiment of the present invention, a homing system is provided for guiding a missile towards a metallic target during a terminal encounter therewith. The metallic target is illuminated with a transmitted radar signal of a predetermined fundamental frequency, and the metal target reflects FUNDAMENTAL FREQUENCY RADAR signals and produces HARMONIC FREQUENCY RADAR signals having a frequency that is harmonic with the fundamental frequency. A tracking antenna is mounted in the missile for scanning a predetermined scan pattern in front of the missile to detect signals from the metal target, including the FUNDAMENTAL and HARMONIC FREQUENCY RADAR signals. The signals on the antenna are transmitted to a splitter which divides these signals into first and second channels.

A local oscillator circuit generates a FUNDAMENTAL FREQUENCY REFERENCE signal at a frequency corresponding to the predetermined fundamental frequency. The local oscillator circuit also generates a HARMONIC REFERENCE signal at a frequency corresponding to a selected harmonic of the predetermined fundamental frequency. First and second bandpass filters are placed in the first and second channels, respectively. The first filter passes signals within a selected frequency range of the predetermined fundamental frequency to a first filter output, and the second filter passes signals within a selected frequency range of a selected harmonic of the predetermined fundamental frequency to a second filter output.

A first demodulator and a second demodulator are connected to the first filter output and second filter output, respectively. The first demodulator demodulates the FUNDAMENTAL FREQUENCY RADAR signals received on the antenna using the FUNDAMENTAL FREQUENCY REFERENCE signal on the local oscillator, thereby producing a FIRST INTERMEDIATE FREQUENCY signal. The second demodulator demodulates the HARMONIC FREQUENCY RADAR signals received on the antenna using the HARMONIC FREQUENCY REFERENCE signal from the local oscillator, thereby producing a SECOND INTERMEDIATE FREQUENCY signal.

First and second detectors are connected to the first and second demodulators, respectively. The first detector produces FIRST STRENGTH signals proportional to the signal strength of the FIRST INTERMEDIATE FREQUENCY signals. Likewise, the second detector produces SECOND STRENGTH signals proportional to the signal strength of the SECOND INTERMEDIATE FREQUENCY signals.

A threshold detector receives the SECOND STRENGTH signals and generates a THRESHOLD signal when the integrated value of the SECOND STRENGTH signal exceeds a predetermined threshold. Since the signal strength of HARMONIC signals produced by the missile is proportional to the distance between the missile and the target, the THRESHOLD signal is generated when the missile is within a predetermined distance of the target. A switch is moveable between two positions, a first position for receiving the FIRST STRENGTH signals and a second position for receiving the SECOND STRENGTH signals. An actuator is responsive to the THRESHOLD signal for moving the switch from the first position to the second position so that the switch is disconnected from the FIRST STRENGTH signals and connected to receive the SECOND STRENGTH signals.

An error circuit receives the FIRST STRENGTH signals when the switch is in the first position and receives the SECOND STRENGTH signals when the switch is in the second position. The error circuit is responsive to either the FIRST or the SECOND STRENGTH SIGNALS TO produce ERROR signals indicating the direction to the target relative to the missile. The ERROR signals are applied to the missile guidance system for correcting the flight of the missile to guide it towards the target.

BRIEF DESCRIPTION OF THE DRAWINGS

The present invention may best be understood by those of ordinary skill in the art by reference to the following Detailed Description when considered in conjunction with the accompanying Drawings in which.

DETAILED DESCRIPTION

Figure 1:
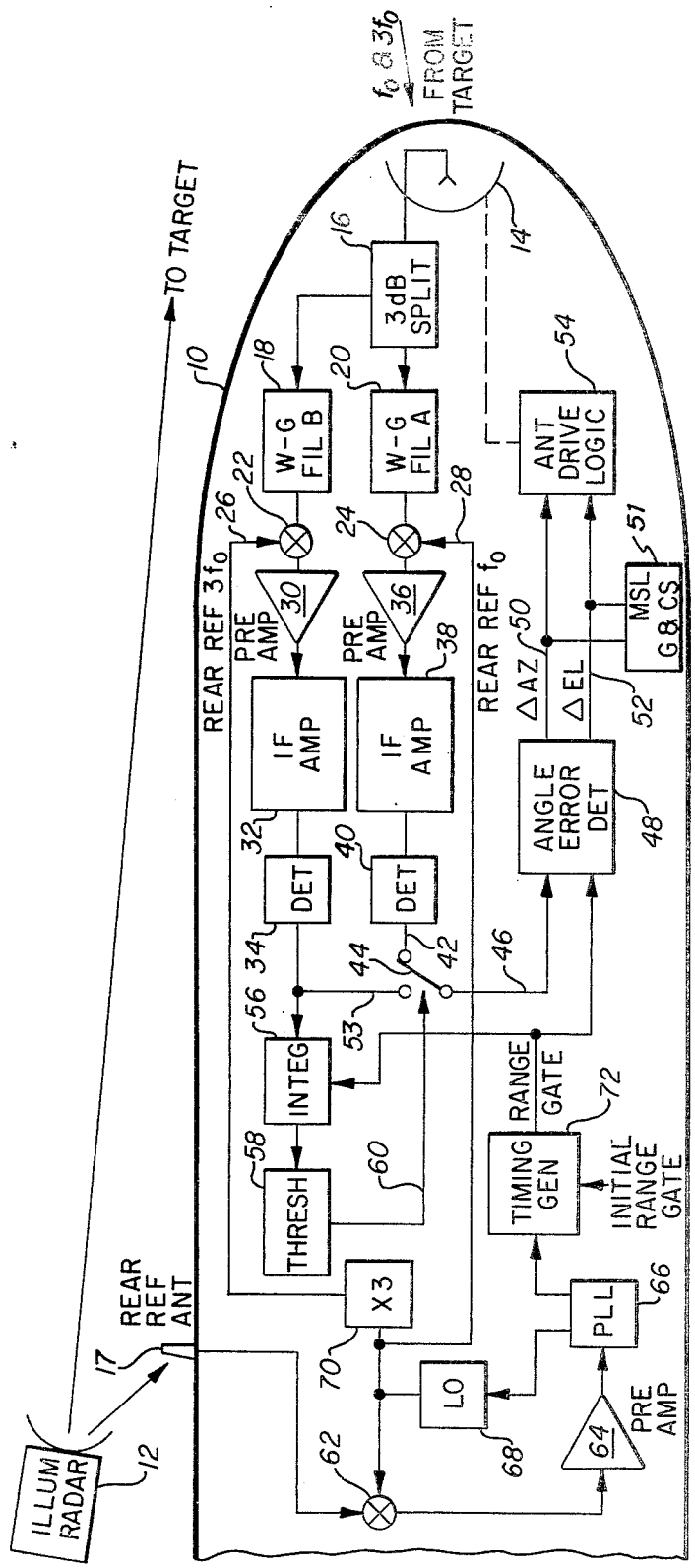
FIG. 1 is a diagram of a missile guidance system embodying the present invention in which THIRD HARMONIC RADAR signals from a metal target are utilized to guide a missile.

Referring now to FIG. 1, there is shown a guidance system for a missile 10 embodying the present invention. An illuminating radar unit 12 transmits a RADAR signal to illuminate a metal target. The transmitted radar pulse from radar unit 12 must be spectrally pure. This spectral purity may be achieved by using a waveguide bandpass filter on the unit 12. The transmitted RADAR signal is reflected from the metal target, and as previously explained, the metal target produces HARMONIC signals having a frequency that is harmonic with the frequency of the transmitted RADAR signal. The signals reflected from the metal target, including the fundamental and third harmonic frequency of the transmitted RADAR signal, are received by a tracking antenna 14 mounted in the nose of the missile 10.

The antenna 14 may be any of a number of conventional tracking antennas suitable for use in a missile guidance system. In the guidance system shown in FIG. 1, the antenna 14 is designed to receive signals from the direction in which it is pointing, and the antenna is moved through a selected scan pattern to provide tracking signals in a conventional manner.

The signals from the antenna 14 are directed to a three decibel splitter 16, that splits the signals on antenna 14 into a pair of channels. The splitter 16 applies the signals from antenna 14 to a wave guide filter 18 and a wave guide filter 20. The filters 18 and 20 are conventional bandpass filters designed to pass signals within a selected frequency range and block all other signals. The filter 18 is designed to operate at frequencies near the third harmonic frequency of the fundamental frequency produced by the illuminating radar unit 12 while the filter 20 is designed to operate at the fundamental frequency of the radar unit 12.

The outputs of the filters 18 and 20 are connected to mixers 22 and 24, respectively, which are used to demodulate the radio frequency signals received by the antenna 14. The mixer 22 receives a REAR REFERENCE $3f_0$ signal on a line 26 which is mixed with the output of the filter 18 to demodulate the THIRD HARMONIC FREQUENCY RADAR signal that was produced by the metal target when illuminated by the radar unit 12. The demodulated signal from the mixer 22 is amplified by a preamplifier 30 and an intermediate frequency amplifier 32. The output of the amplifier 32 is applied to a detector 34 that detects and measures signal strength. A STRENGTH signal is produced by the detector 34 indicating the strength of the signal received from the intermediate frequency amplifier 32 which corresponds to the strength of the THIRD HARMONIC FREQUENCY RADAR signal received by the antenna 14.

In a similar construction, the mixer 24 receives a REAR REFERENCE $f_0$ signal on a line 28 which is mixed with the output of filter 20 to perform a demodulation function in a known manner. A preamplifier 36 is connected to the output of the mixer 24, and an intermediate frequency amplifier 38 is connected to the output of the preamp 36. The FUNDAMENTAL FREQUENCY RADAR signal reflected by the metal target and received on antenna 14 is demodulated by mixer 24, and this demodulated signal is output through a preamplifier 36 to an intermediate frequency amplifier 38 for amplification. A detector 40 is connected to the output of the intermediate frequency amplifier 38 and produces STRENGTH signals corresponding to the signal strength of the FUNDAMENTAL FREQUENCY RADAR signal received on antenna 14.

The STRENGTH signals of the detector 40 are output on line 42 to a switch 44 which is connected by line 46 to an angle error detector 48. The angle error detector 48 produces ERROR signals, $\Delta AZ$ and $\Delta EL$, on lines 50 and 52, respectively, indicating the direction of the target relative to the missile 10. The $\Delta AZ$ ERROR signal indiates an azimuth angle while the $\Delta EL$ ERROR signal indicates an elevational angle. The combination of the $\Delta AZ$ and the $\Delta EL$ ERROR signals determines a two-dimensional direction in which the antenna 14 should be turned in order to be pointed towards the target. If the antenna is pointed directly towards the target, the $\Delta AZ$ and $\Delta EL$ signals should have a designated zero value.

An antenna drive logic 54 is also connected to lines 50 and 52 for receiving the ERROR signals, $\Delta AZ$ and $\Delta EL$. In response thereto, the antenna drive logic 54 is operable to position the antenna for tracking the target. The direction in which the antenna 14 is pointing will be moved towards the target. This movement will tend to place the target in the center of the scan pattern of antenna 14.

A conventional missile guidance and control system 51 guides the flight path of the missile 10. In the system described in FIG. 1, the missile guidance and control system 51 receives two sets of signals, the ERROR signals and signals indicating the orientation (point direction) of the antenna 14. The point direction of antenna 14 is defined by the center axis of the scan pattern of the antenna. The missile guidance and control system 51 will correct the flight of the missile 10 to follow the point direction of the antenna and to attempt to place the target in the center of the antenna scan pattern in response to the ERROR signals. However, it will be understood that other conventional guidance and control systems may be used that respond only to one of the above sets of signals. For instance, the point direction, and therefore the scan pattern of antenna 14 may be fixed with respect to the missile 10, and the system 51 would respond to the ERROR signals to guide the missile 10. Reorientation of the missile 10 would also reorient the antenna 14 to point more towards the metal target. Alternately, the point direction of the antenna 14 may be movable and be controlled to point towards the metal target in response to the ERROR signals, and the conventional guidance and control system 51 may be responsive only to the orientation of the antenna 14 to guide the missile 10. In this latter system, the missile 10 is guided indirectly by the ERROR signals. The type of conventional guidance and control system 51 used to implement the present invention is not critical.

The output of the detector 34 is also applied through line 53 to the switch 44. The switch 44 is moveable between two positions. In the first position, switch 44 connects line 42 from the detector 40 to the line 46. In the second position, switch 44 connects line 53 from the detector 34 to the line 46. In this manner, either the STRENGTH signals from detector 34 or 40 will be applied to line 46 to be used by the angle error detector 48 in determining the ERROR signals, $\Delta AZ$ and $\Delta EL$.

Regardless of whether the angle error detector 48 receives the STRENGTH signals from detector 34 or detector 40, the ERROR signals are determined in the same manner. The error detector 48 constantly monitors the position of antenna 14 as it moves through a scan pattern and determines the scan pattern position on which the strongest STRENGTH signals are received. In a conical scan pattern, the angle error detector 48 will receive a train of STRENGTH signals with the sequential positions of the signals in the signal train corresponding to angular positions in a circle around the tracking axis of the antenna 14. From this train of signals, the $\Delta AZ$ and $\Delta EL$ ERROR signals are extracted in a conventional manner.

The output of the detector 34 is also applied to an integrater 56 whose output is applied to a threshold detector 58. Output of the detector 34 is integrated over a selected period of time, and the threshold detector 48 produces a THRESHOLD signal on line 60 when this integrated value exceeds a predetermined threshold. When the missile 10 is within a selected distance from the target, the integrated output of the detector 34 will exceed the threshold value of the threshold detector 58, and a THRESHOLD signal will be produced on the line 60. The THRESHOLD signal indicates that the missile 10 is in close proximity to the target and marks the beginning of the terminal encounter with the target. During the terminal encounter, the THIRD HARMONIC RADAR signals reflected from the target are of sufficient strength to be detected for guiding the missile 10 towards the target.

The THRESHOLD signal on line 60 is applied to actuate the switch 44, causing it to move from the first position connected to the line 42 to the second position connected to line 53. In this construction, the missile 10 will detect FUNDAMENTAL FREQUENCY RADAR signals reflected from the target for use in guiding the missile 10 until the terminal encounter. At the beginning of the terminal encounter, the THRESHOLD signal will be produced, and an actuator in the switch 44 will move the switch to the second position connected to line 53. Thus, during the terminal encounter, the THIRD HARMONIC signals produced by the target are used to guide the missile 10.

A mixer 62 is connected to receive one input from a rear reference antenna 17 that receives the FUNDAMENTAL FREQUENCY RADAR signal directedly from the illuminating radar unit 12. The output of the mixer 62 is applied through a preamp 64 to a phase lock loop 66. The output of the phase lock loop 66 is applied to control a local oscillator 68. The other input to the mixer 62 is supplied by the output of the local oscillator 68. The phase lock loop 66 locks the output of the local oscillator in frequency and phase with the FUNDAMENTAL FREQUENCY RADAR signal received on the rear reference antenna 17 from the illuminating radar unit 12.

The output of the local oscillator 68 is also applied as an input to the mixer 24 through line 28 and is designated as the REAR REFERENCE $f_0$ signal. The output of the local oscillator 68 is also applied through a frequency multiplier 70 that multiples the frequency of the local oscillator 68 by a factor of 3. The output of the frequency multiplier 70 is applied as an input to the mixer 22 on the line 26 and is referred to as the REAR REFERENCE $3f_0$ signal. The signals on lines 26 and 28 are used for demodulation in the manner previously described.

A STROBE signal is also output from the phase lock loop 66 and applied to a timing generator 72 to indicate the beginning of each radar pulse. The function of the timing generator 72 is to provide a RANGE GATE signal to the integrator 56 and to the angle error detector 48. The RANGE GATE signal activates the integrator 56 and the angle error detector 48 during a gate period in which the radar signals reflected from the target should be received by the missile 10. The initial range gate produced by the timing generator 72 is supplied by an INITIAL RANGE GATE signal. The system producing the INITIAL RANGE GATE signal is far removed from the present invention, but this signal is shown for completeness.

Figure 2:
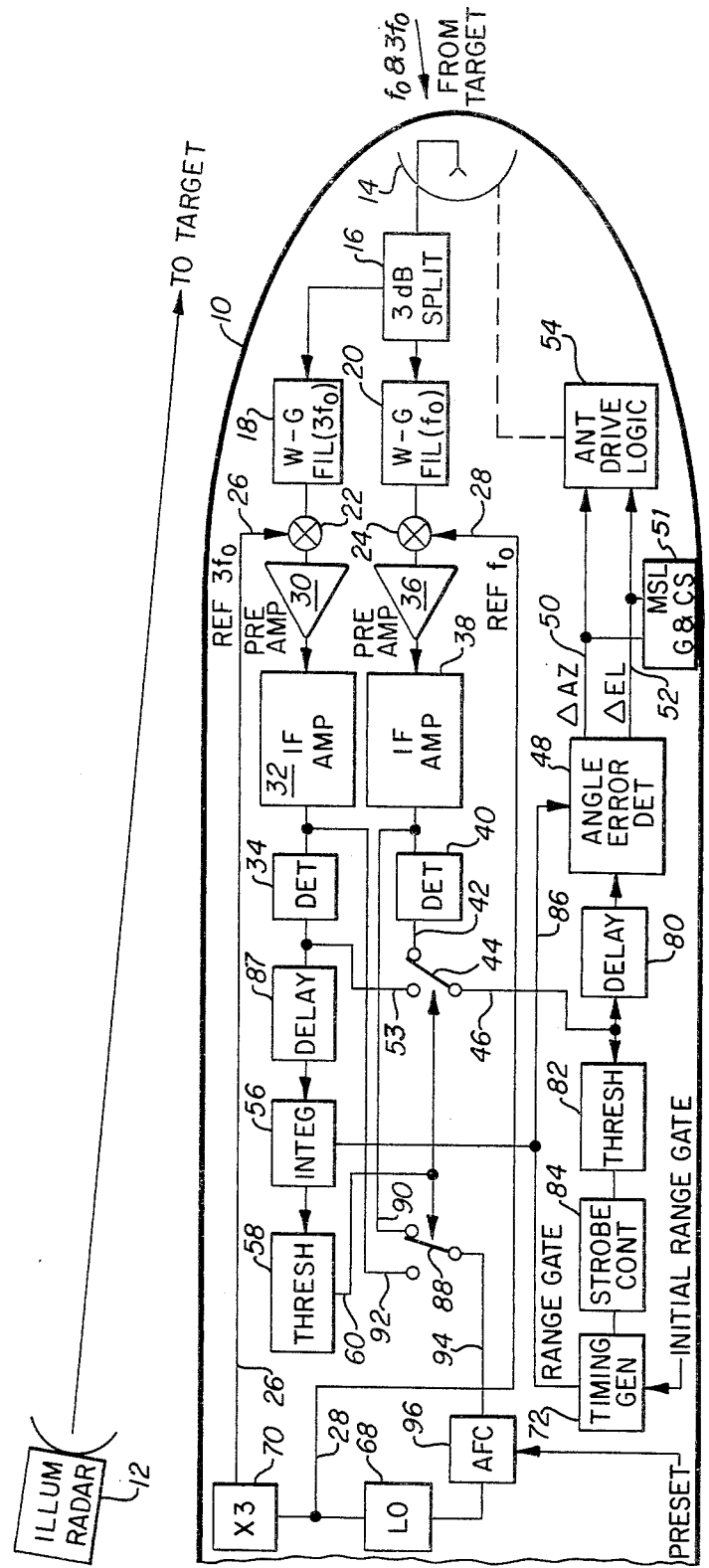
FIG. 2 is a diagram of a missile guidance system disclosing another embodiment of the present invention.

Referring now to FIG. 2, an alternate embodiment of the invention is shown. Corresponding parts or elements in FIGS. 1 and 2 are designated by corresponding reference characters. The guidance system shown in FIG. 2 is substantially similar to the system shown in FIG. 1 except that the rear reference antenna 17 and associated circuitry are eliminated and an alternate method of demodulating the received radar signal is employed.

In FIG. 2, as in FIG. 1, the antenna 14 receives signals from the target which the splitter 16 divides into two channels. The filters 18 and 20, the mixers 22 and 24, the preamps 30 and 36, the intermediate frequency amps 32 and 38, and the detectors 34 and 40 shown in FIG. 2 perform the same function as described in conjunction with FIG. 1. As in FIG. 1, the switch 44 selectively connects the line 46 to either line 42 from the detector 40 or line 53 from the detector 34.

The line 46 is connected through a delay line 60 to the angl error detector 48. Line 46 is also connected to a threshold detector 82 which detects the presence of a radar pulse and produces an output to the strobe control circuit 84 to indicate the presence of a radar pulse. The strobe control regenerates the pulse repetition rate of the illuminating radar and provides range gating control. The output of the strobe control circuit 84 is applied to the timing generator 72 whih produces the RANGE GATE signal 86. The initial range gate is controlled by an external signal, an INITIAL RANGE GATE signal.

The output of the timing generator 72 is the RANGE GATE signal and is applied along line 86 to the integrater 56 and the angle error detector 48. This signal activates the integrator 56 and the angle error detector 48 for a selected period of time for responding to signals. The range gating of the circuits shown in FIGS. 1 and 2 is considered conventional.

The output of the detector 34 is applied through a delay line 87 to an integrator 56. When the integrated value of the output of the detector 34 exceeds a predetermined threshold, the threshold detector 58 produces a THRESHOLD signal on line 60 as previously described. The threshold detector 58 is applied to the switch 44 to actuate the switch from a first position connected to line 42 to a second position connected to line 53. The THRESHOLD signal is also applied to a switch 88 to actuate the switch 88 from a first position connected to a line 90 to a second position connected to a line 92. Lines 90 and 92 are connected to the output of the intermediate frequency amplifiers 38 and 32, respectively. Before the THRESHOLD signal is produced, the output of the intermediate frequency amplifier 38 is applied through the line 90 and switch 88 to a line 94 which is connected to an automatic frequency control 96. The automatic frequency control 96 is connected to the local oscillator 68 for controlling the local oscillator to produce a signal corresponding to the fundamental frequency of the signal reflected from the target. During this period the automatic frequency control 96 uses the output of the intermediate frequency amplifier 38 to determine the fundamental frequency.

At the beginning of the terminal encounter, the THRESHOLD signal is applied on line 60 which actuates the switch 88 into contact with the line 92. During the terminal encounter, the automatic frequency control 96 uses the output of the intermediate frequency amplifier 32 to determine the fundamental frequency. Also, as described in conjunctin with FIG. 1, the output of the local oscillator 68 is applied through the frequency multiplier 70 to the mixer 22 for performing demodulation of THIRD HARMONIC FREQUENCY RADAR signals received on the antenna 14.

In the circuit described in FIG. 2, the RANGE GATE signal on line 86 is produced in response to the FUNDAMENTAL or HARMONIC FREQUENCY RADAR signals reflected from the target. There is a slight delay from the time the RADAR signals are received on antenna 14 to the time the RNAGE GATE signal is produced on line 86. It is necessary that the RANGE GATE signal be present and applied to the angle error detector 48 before the STRENGTH signals from either detector 34 or 40 are applied to the angle error detector 48. Thus, the delay line 80 is interposed between the switch 44 and the angle error detector 48. Also, it is necessary that the RANGE GATE signal be applied to the integrator 56 before the STRENGTH signal from the detector 34 is applied to this integrator. Therefore, a delay line 87 is interposed between the detector 34 and the integrator 56.

It will be understood that the angle error detector 48 shown in FIG. 2 functions in the same manner as described in conjunction with FIG. 1 to produce the $\Delta AZ$ and $\Delta EL$ ERROR signals on lines 50 and 52 which are applied to the antenna drive logic 54 and to the missile guidance and control system.

Although particular embodiments of the invention have been described in the foregoing detailed description, it will be understood that the invention is capable of numerous rearrangements, modifications and substitutions of parts without departing from the spirit of invention.

I claim:

1. A homing system for guiding a missile towards a metal target where the metal target is illuminated with a transmitted radar signal of a predetermined frequency, the metal target reflecting the radar signal and producing harmonic signals having frequencies harmonic with the predetermined frequency, comprising:

a tracking antenna mounted in the missile and moving through a scan pattern for receiving the harmonic signals and the reflected radar signals;

a first detector responsive to the received radar signals to produce a first strength signal proportional to the signal strength of the received radar signals;

a second detector responsive to at least a selected one of the harmonic signals to produce a second strength signal proportional to the signal strength of the selected harmonic signal;

a switching circuit connected to receive said strength signals and to route said first strength signal to an output terminal thereof when said second strength terminal is less than a preset threshold and to route said second strength signal to said output terminal when said second strength signal is greater than said preset threshold;

an error circuit for monitoring the position of the antenna in the scan pattern, for receiving the strength signal from said output terminal and for producing error signals indicating the direction of the target relative to the missile according to the position of the antenna at the time the strongest selected harmonic signal in the scan pattern was received; and a guidance and control system responsive to the error signals for correcting the flight path of the missile to guide the missile towards the target.

2. A homing system for guiding a missile towards a metal target, where the metal target is illuminated with a transmitted radar signal of a predetermined frequency, the metal target reflecting the radar signal and producing harmonic signals having frequencies harmonic with the predetermined frequency, the guidance system including a tracking antenna mounted in the missile for receiving the reflected radar signal from the target, a first detection system responsive to the reflected radar signal received on the antenna to produce first strength signals indicating the strength of the reflected radar signals and an error circuit connected to the first detection system for receiving the strength signals and for producing error signals in response thereto indicating the direction of the metal target relative to the missile, the homing system comprising:

the antenna receiving the harmonic signals produced by the target when illuminated with the transmitted radar signal; and a second detection system responsive to selected harmonic signals received on the antenna for producing second strength signals indicating the strength of the selected harmonic signals; and switching means for selectively disconnecting the first detection system from the error circuit and connecting the second detection system to the error circuit so that the error circuit receives the second strength signals and is responsive thereto for producing the error signals.

3. The homing system of claim 2 wherein the second detection system comprises:

a filter connected to the antenna for passing selected harmonic signals and for blocking other signals;

a demodulator connected to said filter for demodulating the selected harmonic signals to produce an intermediate frequency signal; and a detector responsive to the intermediate frequency signals to produce the strength signals.

4. The homing system of claim 2 wherein the switching means comprises:

a switch moveable between a first position connecting the first detection system to the error circuit and a second position connecting the second detection system to the error circuit;

a threshold detector connected to the second detection system for producing a threshold signal when the magnitude of the second strength signals exceeds a predetermined threshold; and said switch being actuated by the threshold signal to move to the second position.

5. A homing system for guiding a missile towards a metal target, wherein the metal target is illuminated with a transmitted radar signal of a predetermined fundamental frequency, the metal target reflecting the fundamental frequency radar signals and producing harmonic frequency radar signals having frequencies harmonic with the fundamental frequency, comprising:

a tracking antenna for scanning a predetermined scan pattern in front of the missile to detect signals emanating from the metal target, including the fundamental and harmonic frequency radar signals;

a splitter for splitting the antenna signals into first and second channels;

a local oscillator circuit for generting a fundamental frequency reference signal at a frequency corresponding to the predetermined fundamental frequency and for generating a harmonic frequency reference signal at a frequency harmonic with the fundamental frequency reference signal;

a first filter in the first channel for passing signals within a selected frequency range of the predetermined fundamental frequency;

second filter means in the second channel for passing signals within a selected frequency range of a selected harmonic of the predetermined fundamental frequency;

a first demodulator connected to said first filter for receiving the fundamental frequency radar signals and connected to receive the fundamental frequency reference signal for demodulating the fundamental frequency radar signals to produce first intermediate frequency signals;

a second demodulator connected to said second filter for receiving selected harmonic frequency radar signals and connected to receive the harmonic frequency reference signals for demodulating the selected harmonic frequency radar signals to produce second intermediate frequency signals;

a first detector responsive to the first intermediate frequency signals to produce first strength signals that are proportional in magnitude to the strength of the fundamental frequency radar signals;

a second detector responsive to the second intermediate frequency signals to produce second strength signals that are proportional in magnitude to the selected harmonic frequency radar signals;

a switch moveable between first and second positions for selective connection to the first strength signals and to the second strength signals;

a threshold detector for receiving the second strength signals and for generating a threshold signal when the integrated value of the second strength signals exceeds a predetermined threshold, whereby the threshold signal is generated when the missile is within a predetermined distance of the metal target;

said switch including an ctuator responsive to the threshold signal for moving the switch from the first position to the second position; and an error circuit receiving the first strength signals when said switch is in the first positon and receiving the second strength signals when said switch is in the second position, said error circuit being operable to monitor the position of said antenna in the scan pattern and being responsive to the strength signals to produce error signals indicating the direction to the target relative to the missile according to the position of the antenna at the time the strongest radar signals were received from the metal target.

6. The homing system of claim 5 wherein said local oscillator circuit comprises:

a rear reference antenna mounted on the missile for receiving the transmitted radar signal that is illuminating the metal target;

a local oscillator for generating the fundamental frequency reference signal;

a phase lock loop for locking the frequency of said local oscillator to the frequency of the transmitted radar signal received on the rear reference antenna; and a frequency multiplier receiving the fundamental frequency reference signal for producing the harmonic reference signal.

7. The homing system of claim 5 wherein said local oscillator circuit comprises:

a local oscillator for generating the fundamental frequency reference signal;

an automatic frequency control for being selectively connected to receive one of the intermediate frequency signals from one of said demodulators, said automatic frequency control being operable to control the local oscillator to produce the fundamental frequency reference signal at a frequency corresponding to the frequency of the fundamental frequency radar signal received on said tracking antenna; and a frequency multiplier receiving the fundamental frequency reference signal for producing the harmonic reference signal.

8. A homing technique for guiding a missile towards a metal target during a terminal encounter therewith, comprising:

illuminating the metal target with a transmitted radar signal of a predetermined frequency, the metal target reflecting the radar signal and producing harmonic signals having frequencies harmonic with the predetermined frequency;

detecting the radar signal reflected from the target and producing a first strength signal indicating the strength of the reflected radar signal;

detecting the harmonic signals produced by the target and producing second strength signals indicating the strength of the detected harmonic signals;

coupling the first strength signal to an error circuit when the second strength signal is less than a preset threshold;

coupling the second strength signal to the error circuit when the second strength signal exceeds the preset threshold;

producing error signals from said error circuit in response to the one of said strength signals coupled thereto to indicate the direction to the metal target relative to the missile; and guiding the missile in response to the error signals to correct the flight path of the missile to guide the missile towards the metal target.

9. A homing technique for guiding a missile towards a metal target wherein the metal target is illuminated with a transmitted radar signal of a predetermined frequency, the metal target reflecting the radar signal and producing harmonic signals having frequencies harmonic with the predetermined frequency, the homing technique comprising:

moving a tracking antenna through a scan pattern to receive signals from the metal target;

filtering and detecting the signals received on the antenna to determine the presence and signal strength of radar signals and harmonic signals from the metal target;

producing a first strength signal corresponding to the signal strength of the third harmonic signals produced by the metal target;

producing a second strength signal corresponding to the signal strength of the reflected radar signals;

monitoring a selected one of said strength signals and the position of the antenna in the scan pattern; and producing error signals as a function of said selected strength signal and said antenna position to indicate the direction to the metal target relative to the missile.

* * * * *